Nov. 25, 1969  R. L. HAMBY  3,480,350

THREE-WAY VEHICLE MIRROR

Filed Sept. 15, 1965  2 Sheets-Sheet 1

Robert L. Hamby
INVENTOR.

BY *Clarence A. O'Brien
and Harvey B. Jackson*
Attorneys

Nov. 25, 1969     R. L. HAMBY     3,480,350
THREE-WAY VEHICLE MIRROR
Filed Sept. 15, 1965     2 Sheets-Sheet 2
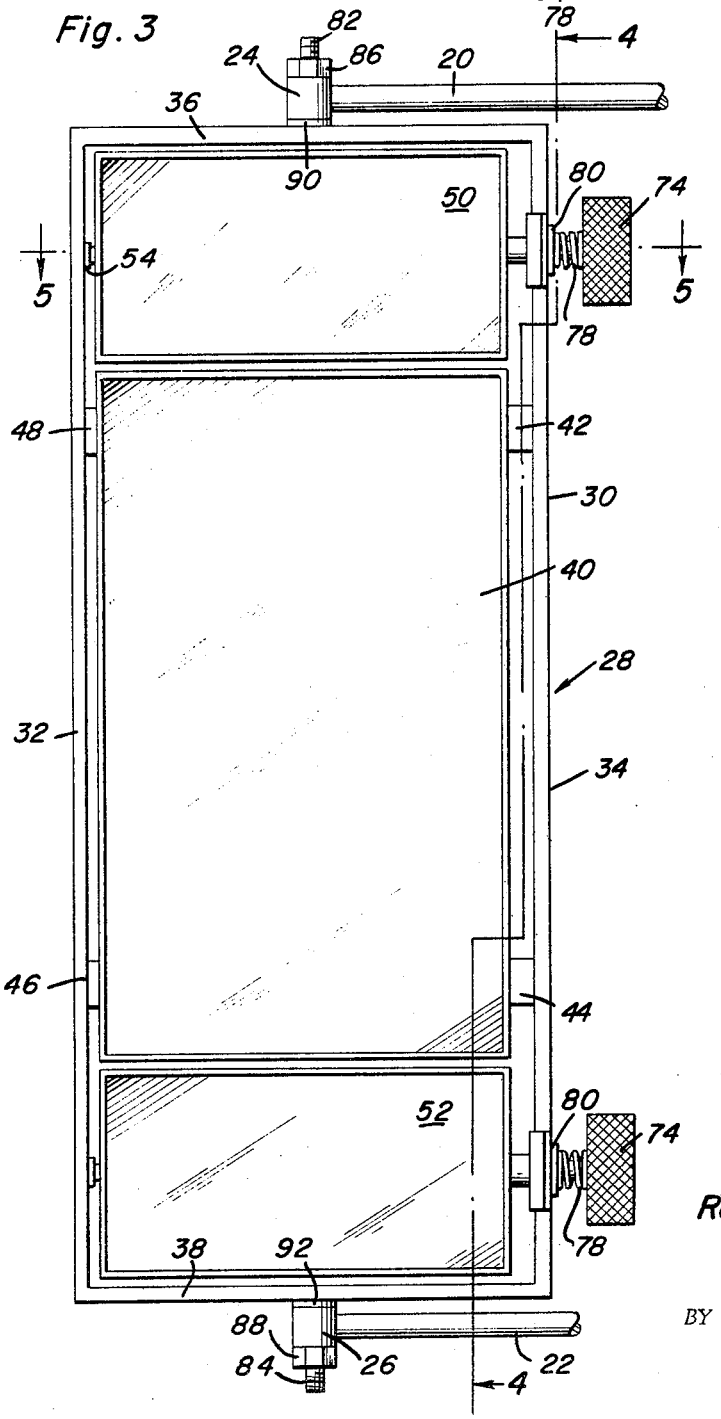
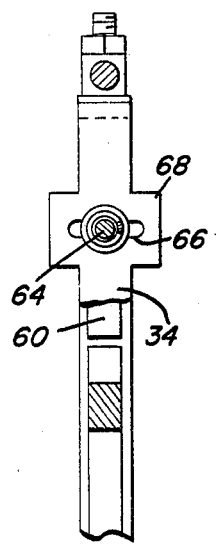
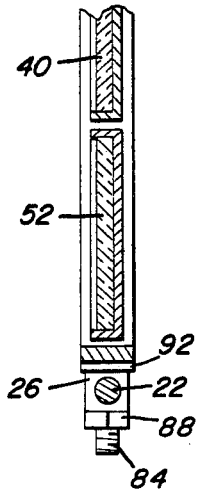
Robert L. Hamby
INVENTOR.

United States Patent Office 3,480,350
Patented Nov. 25, 1969

3,480,350
THREE-WAY VEHICLE MIRROR
Robert L. Hamby, Dodge City, Kans., assignor of fifty percent to Sam M. Caughron, Dodge City, Kans.
Filed Sept. 15, 1965, Ser. No. 487,371
Int. Cl. B60q 1/30
U.S. Cl. 350—304                 3 Claims

ABSTRACT OF THE DISCLOSURE

A rear vision mirror assembly for exterior mounting on the side of a vehicle, the mirror including a main frame adjustably oscillatable about an upright axis and from which three upstanding mirrors are supported, one of the three mirrors being stationarily supported relative to the main frame and the other two mirrors being supported from the main frame for individual angular adjustment about both a horizontal axis and a vertical axis relative to the main frame.

---

This invention relates to a novel and useful vehicle rear vision mirror and more specifically to a rear vision mirror assembly adapted to give the operator of an associated vehicle a complete and full rearward view of the road over which he is traveling without relaying upon a convex mirror or reflecting surface which greatly diminishes the size of the image.

The vehicle mirror assembly of the instant invention utilizes a plurality of plain mirrors or reflecting surfaces which are supported for individual adjustment relative to the associated vehicle. By utilizing a plurality of plain mirrors, each individual mirror may be so adjusted to provide a rearward view of a given section of the road over which the associated vehicle is traveling. Although convex mirrors or reflecting surfaces may be utilized to provide a full rearward view of a road by means of a single mirror element, the image produced by a convex reflecting surface is reduced in size proportional to the radius curvature of the convex mirror. Accordingly, a convex spherical mirror adapted to provide a wide field of rearward vision provides a greatly reduced image and is useful only to provide a means whereby the general condition of the road to the rear of the associated vehicle may be ascertained inasmuch as it is extremely difficult to judge distances with a mirror providing such reduced images.

The mirror assembly of the instant invention includes a main and larger plain mirror element which is supported in fixed position relative to a support member mounted for movement about an upstanding axis relative to a mounting bracket adapted to be supported from an associated vehicle. The mounting bracket of the mirror assembly is constructed whereby certain changes therein may be utilized to adjustably vary the fore-and-aft tilt of the axis of rotation of the support member relative to the mounting bracket. In addition, the support member includes a pair of smaller mirror elements each of which is supported from the support member for oscillation about a horizontal axis and for limited oscillation about an upstanding axis relative to the support member. In this manner, the main larger mirror element may be adjusted so as to provide a rearward view such as that provided by a conventional rear vision mirror and the smaller mirror elements may be adjusted to suit the individual driver's requirements so as to provide additional rearward view either directed to the right or to the left of the rearward view afforded by the main mirror element and/or an elevated or depressed rearward view relative to the view provided by the main mirror element. However, inasmuch as the main support member from which all three mirror elements are supported is itself mounted for oscillation about an upstanding axis relative to the mounting bracket of the mirror assembly, after the elevation of the rearward views afforded by the three mirror elements has been adjustment of the support member relative to the mounting bracket about its upstanding axis of rotation will simultaneously adjust all three mirror elements to swing the rearward views afforded thereby to either the right or the left such as may be deemed necessary when the driver of the associated vehicle moves his adjustable seat between fore-and-aft adjusted positions, it being understood that the three mirror elements of the mirror assembly of the instant invention are in substantial horizontal alignment with the driver of the associated vehicle.

The main object of this invention is to provide a rear vision mirror assembly which will be capable of providing rearward views of substantially the entire roadway behind an associated vehicle.

Another object of this invention, in accordance with the immediately preceding object, is to provide rearward views which are not represented by greatly diminished images.

Yet another object of this invention is to provide a rear vision mirror assembly including a plurality of individually adjustable mirror elements.

A final object of this invention to be specifically enumerated herein is to provide a rear vision mirror assembly in accordance with the preceding objects which will conform to conventional forms of manufacture, be of simple construction and easy to use so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a top plan view of the support member of the rear vision mirror assembly removed from engagement with its supporting mounting frame;

FIGURE 3 is a fragmentary elevational view of the rear vision mirror assembly with portions of the mounting frame being broken away;

FIGURE 4 is a fragmentary vertical sectional view taken substantially upon the plane indicated by the section line 4—4 of FIGURE 3.

Figure 1:
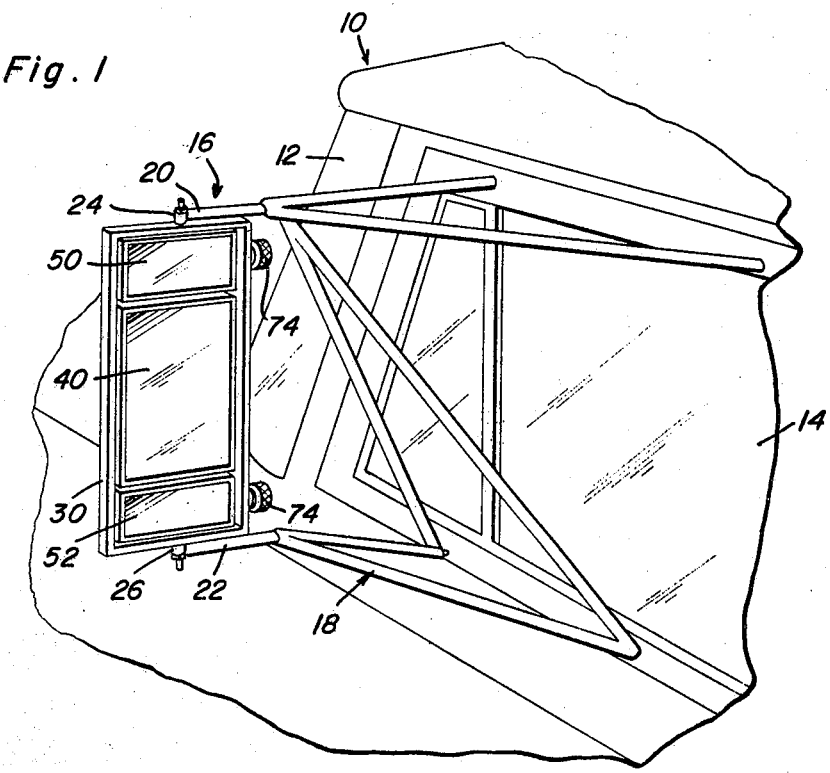
FIGURE 1 is a fragmentary perspective view of a portion of one form of motor vehicle shown with the rear vision mirror assembly operatively mounted thereon.

Referring now more specifically to the drawings, the numeral 10 generally designates a conventional form of motor vehicle including a windshield assembly 12 and a side window assembly 14 on the driver's side of the vehicle 10.

The vehicle rear vision mirror assembly of the instant invention is generally referred to by the reference numeral 16 and includes a mounting bracket generally referred to by the reference numeral 18 supported from the vehicle 10 in any convenient manner outwardly of the side window assembly 14.

The mounting bracket assembly 18 includes a pair of upper and lower outwardly projecting support arms 20 and 22 including upstanding journal portions 24 and 26 on their free ends. The journal portions 24 and 26 are substantially aligned and define bores (not shown) extending vertically therethrough.

The mirror assembly 16 also includes a support member generally referred to by the reference numeral 28 and defining a generally rectangular frame 30. The frame 30 includes upstanding opposite side members 32 and 34 whose upper and lower ends are interconnected by means of upper and lower members 36 and 38. Each of the members 32, 34, 36 and 38 is generally channel-shaped in cross section and opens inwardly of the frame 30.

A centrally disposed and larger mirror element 40 is provided and fixedly supported from the frame 30 in any convenient manner such as by supporting blocks 42, 44, 46 and 48, secured between the members 32 and 34 and the mirror element 40.

In addition, a pair of upper and lower smaller mirror elements 50 and 52 are supported from the frame 30. Inasmuch as the elements 50 and 52 are supported from the frame 30 in the same manner, only the means by which the mirror element 50 is supported from the frame 30 will be specifically described hereinafter.

Figure 5:
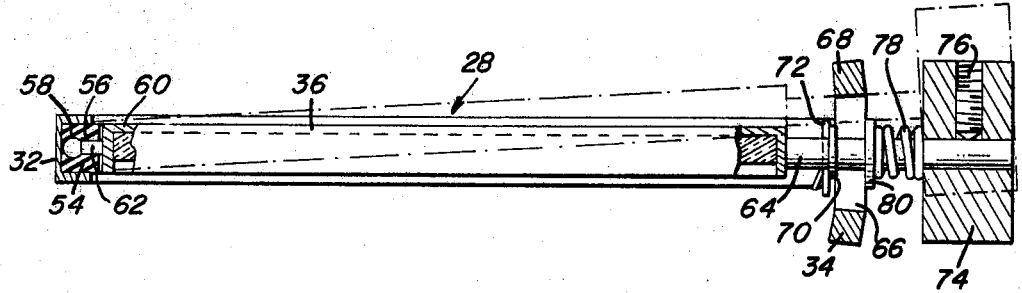
FIGURE 5 is an enlarged horizontal sectional view taken substantially upon the plane indicated by the section line 5—5 of FIGURE 3.

The member 32 has a pivot axis defining resilient sleeve bearing member 54 secured therein and it may be seen from FIGURE 5 of the drawings that the member 54 has a blind bore 56 formed therein including a diametrically enlarged inner end portion 58. The mirror element 50 is supported from a generally rectangular frame 60 in which the mirror element 50 is secured in any convenient manner and the frame 60 includes a stub axle portion 62 complementary to and seatingly received in the bore 56. The opposite side of the frame 60 includes a large diameter stub shaft portion 64 which is rotatably and slidably received in a generally horizontally disposed slot 66 formed in a transversely enlarged portion 68 of the member 34. An abutment washer 70 is disposed about the stub axle portion 64 and between the inner face of the transversely enlarged portion 68 and a removable abutment member in the form of a cotter pin 72 removably secured through the stub axle portion 64.

The stub axle portion 64 extends through the slot 66 and a diametrically enlarged knob 74 is secured to the terminal end portion of the stub axle 64 remote from the frame 60 in any convenient manner such as by a setscrew 76 and a compression spring 78 is disposed between the knob 74 and a second abutment washer 80 bearing against the outer surface of the slotted portion of the transversely enlarged portion 68.

In this manner, each of the mirror elements 50 and 52 may be oscillated about the horizontal axis and the horizontal axis about which they are oscillatable may be angularly adjusted in a horizontal plane about an upstanding axis passing through the corresponding diametrically enlarged end portion 58.

The upper and lower members 36 and 38 of the frame 30 include upwardly and downwardly projecting externally threaded stub axle portions 82 and 84, respectively, which are passed through the sleeve portions 24 and 26. Threaded nuts 86 and 88 are threadedly engaged with the stub axle portions 82 and 84, respectively, and thereby secure the frame 30 between the arms 20 and 22. Of course, friction washers 90 and 92 are utilized between the confronting portions of the frame 30 and the sleeves 24 and 26. In this manner, the nuts 86 and 88 may be adjusted to frictionally retain the frame in adjusted rotated positions relative to the mounting bracket 18.

In operation, the frame 30 may be rotatably adjusted relative to the arms 20 and 22 as desired in order that the mirror element 40 will provide a rearward view of the road over which the vehicle 10 is traveling similar to the rearward view which is provided by a conventional rear vision mirror assembly. Then, the individually adjustable mirror elements 50 and 52 may be adjustably positioned about both their horizontal and vertical axes of oscillation in order to provide selected rearward views complementing the rearward view afforded by the mirror element 40.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rear vision mirror assembly including a mounting bracket adapted to be supported from a vehicle, a frame supported from said bracket for adjustable oscillation about an upstanding axis, a plurality of upstanding mirror elements supported from said frame, one of said elements being supported in stationary position relative to said frame, first means supporting another of said elements from said frame for adjustable oscillation relative thereto about both an upstanding axis and a horizontal axis, said first means including aligned horizontal shaft portions projecting outwardly from opposite sides of the second mentioned adjustable mirror element, one of said shaft portions including an outer end, second means supporting said outer end from said frame in a universal manner and for oscillation about its longitudinal axis relative to said frame, the other of said shaft portions including an outer end, and third means supporting the outer end of the other shaft portion for guided horizontal lateral adjustable shifting relative to said frame and rotation about its longitudinal axis relative to said frame and operative to frictionally maintain said other shaft portion in adjusted selected shifted and rotated position, said third means including a horizontal slot defined in said frame, said outer end of said other shaft portion projecting through and being slidably shiftable along and rotatable in said slot, the terminal end portion of said other shaft portion disposed through said slot and remote from said adjustable mirror element having a manually engageable enlargement mounted thereon spaced outwardly from the slotted portion of said frame for shifting and rotation with said other shaft portion, and an expansion spring disposed on said other shaft portion between said enlargement and said slotted portion of said frame serving to frictionally resist displacement of said other shaft portion relative to said frame.

2. The combination of claim 1 wherein said second means includes a resilient socket member supported from said frame, said outer end of said one shaft portion including a diametrically enlarged partial spherical member seated in said socket member for rotational and universal movement relative thereto.

3. The combination of claim 1 wherein said mirror assembly includes a third mirror element also including a pair of aligned opposite end outwardly projecting shaft portions with one of the shaft portions thereof supported from the frame for universal and rotational movement relative to the frame and the other shaft portion thereof rotatably supported from the frame and also for horizontal lateral shifting relative to the frame, and means operatively connected between said frame and the third mirror element operative to frictionally retain said third mirror element in adjusted position relative to the frame.

References Cited

UNITED STATES PATENTS

| | | | |
|---|---|---|---|
| 2,821,115 | 1/1958 | Weinrich | 350—282 |
| 2,708,086 | 5/1955 | Prutzman | 350—304 |
| 3,146,296 | 8/1964 | Fischer | 350—293 |

FOREIGN PATENTS

| | | |
|---|---|---|
| 622,692 | 5/1949 | England. |

DAVID SCHONBERG, Primary Examiner

MICHAEL J. TOKAR, Assistant Examiner